Sept. 15, 1942.   G. A. LEY   2,295,853
SYNCHRONIZER FOR CAMERAS
Filed Feb. 1, 1941
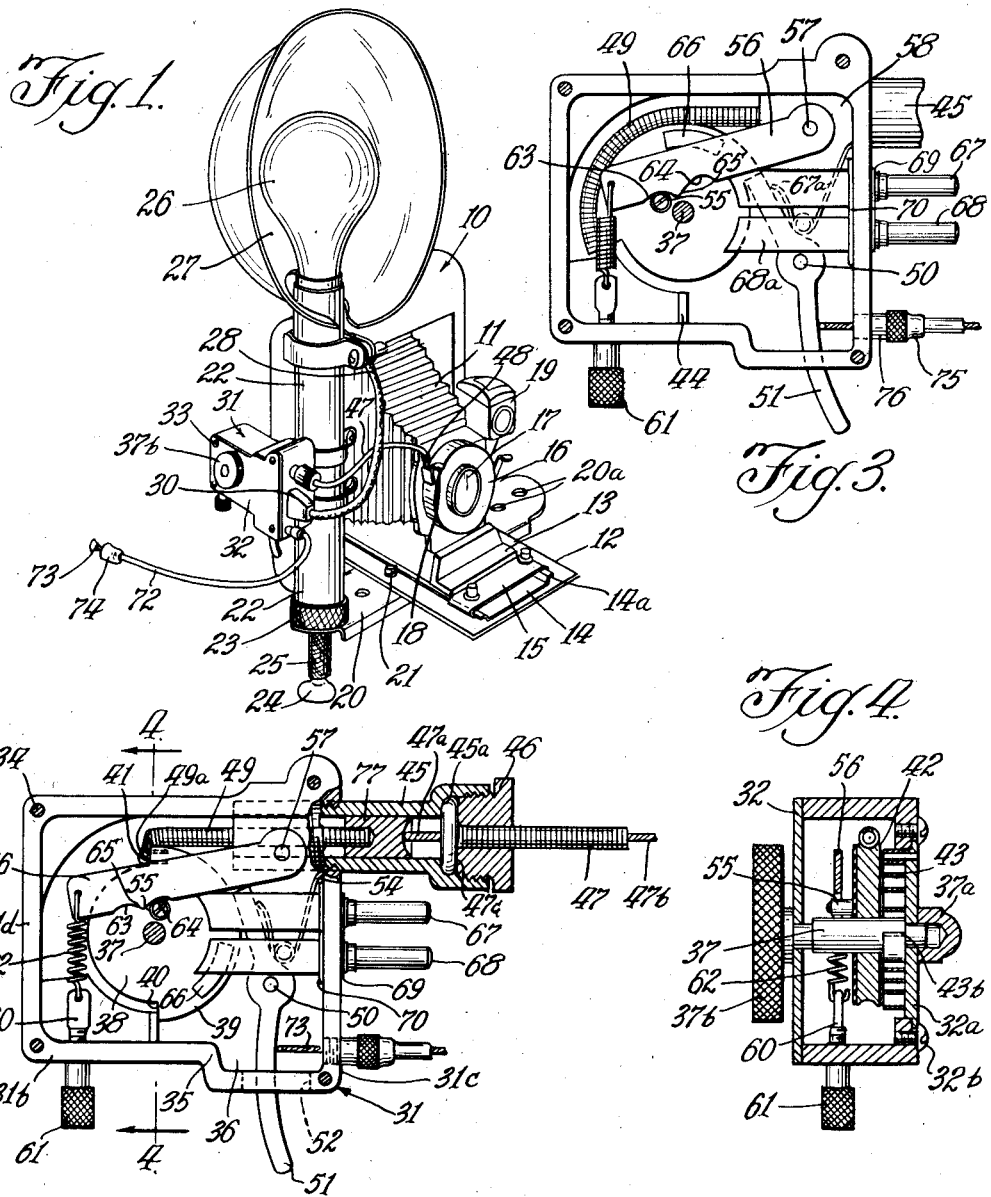
Inventor:
George Albert Ley
By John F Brezina
Atty.

Patented Sept. 15, 1942

2,295,853

UNITED STATES PATENT OFFICE 2,295,853

SYNCHRONIZER FOR CAMERAS

George Albert Ley, Chicago, Ill.

Application February 1, 1941, Serial No. 376,999

7 Claims. (Cl. 67—29)

My invention is directed to a novel device and combination of cooperating structural and mechanical parts which may aptly be termed a synchronizer device adapted to synchronize the operation of the camera shutter with the flashlight means. My invention is adapted for use with camera apparatus for making flashlight pictures.

Such synchronizers as have in a very limited way become presently known embody several objectionable features. For example, the magnetic type of synchronizers, which are operated with the aid of a magnetic coil, utilize and require substantially more current necessarily furnished by portable dry cell or cells to operate the same than is required to ignite the connected flash bulbs. The additional electricity consumed in operation of such magnetic synchronizing devices in relatively short periods weakens the dry cell batteries to a substantial extent, with the result that during substantial times a magnetic type of synchronizer does not synchronize correctly and properly.

A further objectionable feature of any of the present devices used for similar uses has been that the shutters of the so called higher speed cameras open and close so quickly during an instant before the maximum light from the ignited flashlight has been reached; in other words the exposure is taken at a time previous to the maximum portion of the light flash with the result that the exposures are taken upon only a fraction of the actual maximum flashlight capacity of a particular flashlight or globe.

One of the objects of my invention is the provision of a synchronizer having manually adjustable shutter retarding means and an assembly which is adapted to be decelerated or retarded and then accelerated, and which means is adapted to retard the first frictional portion of the travel of the shutter release actuating parts during the preliminary interval that electric contact is being effected to ignite the bulb. A further object of my invention is to provide a manually actuable means for selectively releasing the camera shutter wherein during the latter half or latter portion of the movement of the shutter release parts, an acceleration is effected to operate the shutter at a time during the maximum range of light from the ignited flash bulb.

A further novel feature and object of my invention is the provision of a synchronizer which includes the aforementioned shutter release mechanism and includes a conveniently accessible pivotally mounted lever which is adapted to be moved by the operator's finger where desired with the least possible and practically no transmission of push or movement to the camera, and it is a further object to also provide flexible finger-operated cable release unit for releasing the trigger portion of said lever of the synchronizer to thereby eliminate imparting undesirable vibration or movement to the camera usually in the hands of the operator.

A further important object of my invention is the provision of a relatively inexpensive synchronizing device attachable to a camera which embodies spring actuated means for releasing the camera shutter and simultaneous closing of a circuit to a flashlight bulb and which includes a journalled rotor which is adapted to be powered or rotated in operating direction by a coil spring associated therewith in the manner of attachment of a flat coil type clock spring. A further novel feature is that I provide means whereby the mounting of the spring may be adjusted to suit various shutters of varying speeds, many of which shutters operate more quickly than others.

A further object of my invention is to provide a synchronizer having means associated therewith which may be stationarily mounted upon the battery cell casing or housing to thereby eliminate the necessity for repeatedly attaching and detaching the synchronizer directly to the lens shutter every time the camera is closed or opened. The elimination of this objectionable feature of repeatedly attaching and detaching the synchronizer to the lens shutter also eliminates the danger of injury to the shutter through frequent bumps of the synchronizer upon objects. An advantage of my invention is that the synchronizer substantially mounted upon battery cell casing (which casing itself may be removably connected by said bracket means to the base of the camera) has the release and actuating device thereof connected to the shutter by flexible release cable to the camera shutter, this permitting removal of merely one end of the flexible cable from the camera shutter frame when it is desired to open and close the camera itself.

Other important objects of my invention will be apparent from the following description and appended claims.

On the drawing:

Fig. 1 is a perspective view showing the exterior of my synchronizer mounted on a flashlight and battery casing and both thereof being mounted with respect to the pivoted base plate of a typical camera.

Fig. 2 is an enlarged cross sectional view taken on a vertical plane showing the cover plate of the synchronizer casing removed and showing the interior parts in position after release of the camera shutter.

Fig. 3 is an enlarged elevational view of the interior of the synchronizer housing showing the respective parts in cocked position as preceding release of the camera shutter preceding ignition of the flashlight bulb.

Fig. 4 is an enlarged cross sectional view taken through a vertical plane indicated by lines 4—4 of Fig. 2.

Referring to the drawing, reference numeral 10 designates the main box-like shell or casing of a conventional camera, only a portion of which is illustrated, said camera casing 10 having the conventional extensible bellows 11, and the pivotally and hingedly mounted gate 12 which is adapted to be pivoted outward into a plane perpendicular to the central vertical plane of the camera itself and forms a base on which the movable ends of the bellows and the shutter and shutter frame are slidably mounted. Numeral 13 is a bracket-like member which acts as a support for the shutter frame itself and for the outward end of the bellows, the latter being suitably connected to the upper portion thereof in a well known manner. The pivoted gate 12 of the camera has suitably secured thereon an inverted channel-like guide plate 14 whose lateral flanges extend upwardly and thence angularly outwardly to form guide flanges 14a which are slidably engaged by suitable metal guide plate 15 which is secured on the bracket-like member 13 by suitable screws. The camera includes the usual shutter frame or housing 16, hereinafter also referred to merely as "shutter," the shutter lens 17, the conventional shutter trip lever 18 shown at the left of the shutter frame, and the suitably connected and mounted finder 19. It will be noted that the usual pivoted gate 12 is preferably provided with a pair of spaced apart apertures, one at each lateral edge thereof (not shown) to provide for releasably securing to said camera of a bracket plate 20 by means of suitable screws or bolts 21, only one of which is shown at the lower left of Fig. 1. The bracket and mounting plate 20 is preferably provided with a plurality of longitudinally spaced apart holes 20a so as to provide for convenient mounting of cameras of different widths and sizes. Reference 22 designates an elongated tubular shell or casing adapted to house a plurality of suitable dry cells which are adapted to provide the power source for igniting the flashlight. Reference 24 designates one of a pair of winged headed bolts which thread into apertures 21 to mount said bracket plate 20 to the camera.

The lower end of the battery cell casing 22 is suitably externally threaded and has normally mounted thereon the internally threaded metal cap 23 whose exterior surface is suitably knurled for convenient removal and remounting. The casing end cap 23 has a central threaded aperture therein which engages the threaded end of a wing headed bolt 24, a suitable sleeve or bushing 25 being interposed between the wing head of bolt 24. As shown in the drawing, when mounting the cell container 22 on bracket plate 20, the cell container is placed perpendicularly over the plate and aperture and the knurled headed bolt or screw is threaded to a threaded aperture of the end of container 22 to hold said battery cell container in perpendicular upright position on plate 20.

The upper end of the tubular battery container 22 has suitably mounted therein in conventional manner a lamp receiving socket (not shown). I utilize a lamp receiving socket of the non-threaded yieldable grip type which permits the flashlight to be merely pushed or slipped into the appropriate contacts of the wire-connecting circuit which is adapted to be connected to the battery cells in the herein described manner. The flashlight or globe is designated by numeral 26, and I provide a suitable metal reflector 27 which is suitably secured adjacent the annular edge to the upper edge of the battery casing 22 substantially as illustrated in Fig. 1. The circuit connecting wires from the contacts (not shown) which connect the same to the battery cells are shown as extending from the upper portion of the cell container 22 and designated by the single numeral 28, both of said wires being preferably contained in a single insulated covering. These circuit wires which are shown merely as a single unit 28 have their ends terminating in a suitable "push on" plug 30 which plug itself is of substantially conventional construction for mounting upon two contact terminals or posts hereinafter described.

Describing generally the synchronizer and its contained and associated parts, reference numeral 31 designates a box-like metal case of substantially rectangular cross section which is made with one flat open side defined by the integral upper and lower walls 31a and 31b and by vertically extending forward and rear walls 31c and 31d. This casing is provided with the removably mounted cover plate 32 which is secured by a plurality of suitable screws 33 which pass through corner apertures of said plate 32 and into threaded passages 34 formed in the corner wall portion of the casing or housing 31.

It will be noted as illustrated in Figs. 2 and 3 that the normally lower wall 31b of the shell 31 is bent or formed to extend outwardly as indicated at the shoulder 35 and to then extend toward the juncture thereof with the forward wall 31c, thereby forming a relatively deeper well or compartment portion 36.

Numeral 37 designates a pivot pin or stub shaft which has one end journalled in a suitable aperture in the rotatable side wall plate 32a of the casing 31 and retained in such position by means of a suitable nut 37a as shown in Fig. 4. The opposite end of said shaft 37 is preferably reduced and is threaded and has removably mounted thereon the relatively large knurled thumb screw 37b as shown in Fig. 4. As shown in the drawing, the shaft 37 is mounted perpendicularly to the stationary side wall of the casing 31 and extending transversely to and projecting through the removable cover plate 32. Securely mounted on said stub shaft 37 is a rotor 38 which has substantially one half of its circumferential edge of smaller dimension than the remaining annular periphery thereof, with the larger peripheral edge of the rotor 38 being designated by numeral 39. The substantially diametrically opposite termini of the larger annular edge 39 of rotor 38 form angular shoulders 40 and 41 respectively, between which shoulders the smaller peripheral edge of the rotor extends.

The rotor 38 is made of suitable non-conductive material, such as fibre or the like for purposes which will hereinafter appear. The larger annular periphery 39 of rotor 38 is grooved to provide the arcuate annular groove 42, as shown in Fig. 4, said groove providing a retaining means and guide track for a flexible shutter-operating cable hereinafter described.

A spiral metal spring 43, of a type similar to a flat type clock spring, is mounted in the space between the side wall of casing 31 and the side surface of the grooved rotor 38 as shown in Fig. 4. The end of the spring adjacent the center thereof is suitably secured to the shaft 37, as for example inserting the bent end of said spring 43 into a suitable groove formed in said shaft and indicated at 43b in Fig. 4.

The outer end of said spring 43 is secured to a round removable plate 32a, which forms one side wall of the casing 31, by means of pin 43a shown in Fig. 4 which pin is mounted in plate 32a. The tension of said spring 43 is adjustable by loosening screws 32b and rotating plate 32a to the desired degree and thence tightening screws 32b.

As shown in Figs. 2 and 3, a suitable metal abutment 44 is mounted in inwardly projecting position on the inner surface of the normally lower casing wall 31b and in a position so that it will be struck and engaged by the surface of the shoulder 40 of rotor 38 to limit the clockwise movement of the rotor to the position illustrated in Fig. 2, which position is the position thereof after actuation and release of the camera shutter.

As illustrated in Figs. 1, 2 and 3 respectively, a substantially cylindrical shell 45, having an enlarged integral outer portion 45a, is mounted to extend perpendicularly and normally forwardly of the normally forward wall 31c of casing 31, said mounting being either by removable threading engagement with wall 31c (not shown) or by stationary securance as by welding or the like. The outer portion 45a of the tubular shell 45 forms an annular shoulder 45a and its outer end is internally threaded and receives an exteriorly knurled centrally passaged cap nut 46, and a portion of a flexible cable 47 passes therethru. Only a fragment of said flexible cable 47 is illustrated in Fig. 2. This flexible cable 47 comprises both the internal longitudinal slidable metal cable or strand 47b and the outer covering 47, the latter being mounted on its inner end 47, the flanged head 47c is metal head 47c. The flanged head 47c is clamped between the periphery of cap nut 46 and angular shoulder 45a and thereby releasably mounts one portion of the flexible cable unit secured with respect to the shell 45. The inner end 47a of said flexible cable element 47b projects a short distance into shell 45 as illustrated.

A cylindrical metal plunger 77 is slidably mounted in the reduced portion of shell 45 as illustrated in Fig. 2, and has its concave end normally engaging the end 47a of the flexible cable element 47b.

The inner end of tightly wound spring 49 is securely connected to rotor 38 by a securing staple 49a shown in Figs. 2 and 3. Said staple 49a is suitably secured in the angular shoulder 41 of rotor 38 as illustrated in Fig. 2.

The other end of spring 49 is mounted in the apertured end of a cylindrical plunger 77 which is slidably mounted in the reduced portion of shell 45 as shown. The end of said plunger 77 is concave and said concave end engages and pushes against the inner end of flexible cable 47b.

It will be apparent that during the movements of the rotor from the position illustrated in Fig. 3 to the position shown in Fig. 2 the inner end of the flexible cable 49 is guided by and rides in the peripheral groove 42 of rotor 38.

The other end outer portion of the flexible cable 47 has a suitable knurled threaded bushing 48 on its outer end which is adapted to be manually and removably threaded into a correspondingly threaded passage formed in the camera shutter 16 at a point adjacent to the shutter release lever 18 and in a position so that longitudinal movement of said cable unit 47 will actuate and release the camera shutter.

Securely mounted to the stationary side wall of casing 31 and perpendicularly thereto is a stationary pivot pin 50 substantially as shown in Figs. 2 and 3, and said pivot pin 50 has pivotally mounted thereon the trip lever or trigger 51. The upper portion of the trip lever extends to a point intermediate the pivot pin 50 and the upper wall 31 and is adapted to engage the surface of angular shoulder 40 in the manner illustrated in Fig. 3 to hold the rotor in cocked position and contra to the normal action of the spiral spring 43. The lower portion of the lever 51 extends downwardly through a suitable slot 52 formed in the lowermost portion of the wall 31b as illustrated in Fig. 2, and projects below the casing 31 as illustrated to permit finger operation by the operator when desired.

The lever 51 is normally held in position so that its upper end is pressed against the grooved periphery of rotor 38 by means of suitable hair spring 54, one of which engages the upper end of said lever and the opposite ends of said spring engaging the inner surface of the forward wall 31c substantially as illustrated in Figs. 2 and 3. The action of this spring 54 causes the upper end of said lever to engage the shoulder 40 of rotor 38 when the same is moved counter-clockwise to cocked position.

As is clearly shown in Figs. 2 and 3, a friction stud screw 55 is secured at one end to rotor 38 so that said stud screw extends perpendicularly therefrom at a point spaced from shaft 37 and between the two respective positions illustrated in Figs. 2 and 3.

A retard lever 56 of a length shorter than the length of said casing 31 is pivotally mounted at its normally forward end by means of pivot 57 to a suitably apertured inwardly extending member 58 whereby said lever moves in an arc and in a plane parallel to the plane in which the rotor 38 rotates. The free end of the retard lever extends to points beyond the normally rear periphery of the rotor 38 and is preferably provided with an anchoring aperture at its said end. A connecting bolt 60 normally slidably engages a suitable aperture in the lower wall 31b of the casing 31 and has its upper end suitably apertured as indicated and its lower end is normally held in the illustrated position by a knurled nut 61 threaded on the outer end of said bolt. A suitable coil spring 62, as shown in the left of Figs. 2 and 3, has its ends hooked and anchored respectively in the aperture of retard lever 56 and in the aperture of the bolt 60. It will be apparent that the tension of said spring is adjustable by rotation of the nut 61 to desired positions. The normally lower lateral edge of the retarding lever 56 is formed with two adjacent recesses 63 and 64 respectively as clearly shown in Figs. 2 and 3, said adjacent recesses being separated by the integral projecting tooth 65 as shown. The edge surfaces defined by the recesses 63 and 64 are adapted to frictionally engage the surface of the stud screw 55 due to the adjusted and desired tension of the spring 62, and as the rotor is released in the herein described manner from the position shown in Fig. 3 to the position illustrated in Fig. 2, the stud screw 55 slides along the surface of recess 63 and as it so slides up to the point of the vortex or point of the tooth 65, the rotating movement of the rotor and shaft is slowed down. During such movement and when the stud screws 55 pass the vortex of the tooth 65, the second portion of the clockwise movement of the rotor will be more rapid and accelerated due to the fact that friction between the stud screw 55 and the first portion of the edge surface of the recess 64 is relatively less due to the curvature of the recess. In other words, as the rotor is released from the position illustrated in Fig. 3, the initial portion of its movement will be relatively slower than the second portion of its movement for the above stated reasons, this providing the advantageous feature of closing the electrical circuit between the battery cells and the flashlight a short regulatable interval prior to the actual operation of the camera shutter.

The advantageous result brought about by this construction and operation of the retarding lever above described is that the maximum range of flash is reached before the camera shutter is operated to take the exposure. Were it not for this particularly described construction and operation, the shutter on numerous relatively "quick" cameras would be operated at the time of the flash and before the attainment of the maximum light of the normal flash.

As illustrated in Fig. 3, a substantially flat metal contact member 66 is suitably secured upon the surface of the rotor at a point adjacent its periphery and nearest to the forward wall 31c of the casing 31. Mounted in suitable passages (not shown) or forward wall 31c are a pair of spaced apart contact posts 67 and 68 respectively, both thereof being insulated from the wall 31c of metal casing 31 by non-conductive washers 69 and 70 respectively. The respective contact posts 67 and 68 merge into inwardly extending conductive metal contact springs 67a and 68a respectively which are so spaced apart that when the rotor is moved from position of Fig. 3 to that of Fig. 2, the contact member 66 electrically connects said springs 67a and 68a to close the circuit leading from the dry cell batteries within casing 22 to the flashlight bulb. Part of said circuit is represented by the plug 30 and the dual electrical conducting cord 28 leading therefrom to the contact members in which the socket portion of the flashlight 26 is mounted.

It will be noted that the contact 66 has a length somewhat less than the distance between the upper edge of contact spring 67a and the lower edge of contact spring 68a. See Figure 3. The rotor when engaging these contact springs is traveling rapidly and the circuit will be made for a relatively short-time interval. This permits testing of the synchronizer by employing a small test bulb instead of destroying a relatively expensive flash bulb in order to accurately synchronize the camera. It is possible to employ a miniature flashlight bulb, since these bulbs have approximately the same time lag as a flash bulb. With the flashlight bulb in place of the photo-flash bulb, and when testing, it is merely necessary to look through the back of the camera with the flashlight bulb in front of the lens. When the trigger 51 is pulled, the opening of the shutter and lighting of the flashlight bulb can be very closely observed.

While the outer projecting portion of the trip lever or trigger 51 may be released by the operator's finger, I have provided and also illustrated a flexible cable means for moving and releasing said lever 51 to operate the synchronizer in the herein described manner, such flexible cable means eliminating the possibility of normally undesirable vibration and movement often imparted by finger operation of any connected part of the synchronizer such as the lever 51. Said flexible cable means is illustrated in Fig. 1 and includes the outer flexible passaged covering 72, the flexible metal cable 73 slidable therein, and the finger grip 74 on the free end of said passaged covering. Said flexible cable is removably mounted with respect to the casing 31 by means of a rotatable knurled coupled 75 which threadingly and releasably engages a passaged projecting nipple 76 which nipple is threaded in a suitable threaded aperture in the lower portion of the front wall 31c of the casing 31. In both Figs. 2 and 3, the inner projecting end of the flexible cable 73 is shown contacting the normal forward surface of the trip lever 51. It will be apparent that finger operation of the said flexible cable means will move or trip the lever from the position of Fig. 3 to cause arcuate movement of the rotor, the closing of the flashlight circuit aforedescribed and the actuation of the camera shutter.

I desire it to be understood that the advantageous and novel results hereinabove referred to are attained by operation of my synchronizing device through tripping of the lever, through relatively slower partial rotation of the rotor in substantially the first half of its movement and an accelerated and relatively quicker rotor movement in the second portion of its movement, this resulting in the camera shutter operation at the exact time when the greatest range of light is attained from the flashlight. My described construction provides selectivity and adjustability of my synchronizer to cameras having shutters of different speeds, this through the aforedescribed adjustment of the trip lever whereby the friction between the perpendicularly extending stud screw 55 and the edge surface of the recesses 63 and 64 may be varied to correctly time the shutter operation of a particular camera during the maximum flash of the flashlight. This adjustable timing and speed with which the rotor will partially rotate through the slower and the faster portions of its clockwise movement is further regulatable by the selective adjustment of the tension of the clock spring 43, said selective adjustment being attained by releasing and selectively rotating plate 32a to any one of a number of positions and thence tightening of the screws 32b as illustrated in Fig. 4.

I claim:

1. In combination with a camera including a shutter and mechanism for releasing said shutter; a battery and light socket container; a bracket for releasably mounting said battery and flashlight container to a portion of said camera; a reflector mounted on the upper end of said battery and the socket container; a manually adjustable synchronizing device for adjusting the time of shutter operation to the time of maximum light produced by said flashlight and including a casing, a spring-impelled rotor journalled therein; a projecting stud on said rotor; a conductive metal contact strip on said rotor; electrical contact elements mounted in a wall of said casing and all projecting interiorly so as to be bridged by said contact strip to form a part of the circuit between the flashlight batteries and the flashlight socket; manually operable mechanism for normally holding said rotor in cocked position, the release of said last mentioned mechanism permitting spring-impelled rotation of said rotor, such rotation closing said flashlight circuit for a short time interval and operating said camera shutter; a retarding lever pivotally connected to said casing and having adjacent edge recesses opening toward the center of said rotor, said rotor stud being adapted to frictionally engage the first of said retarding lever recesses as said rotor moves clockwise to thereby retard and delay said clockwise rotor movement and manually adjustable spring means for varying and regulating the friction between said rotor stud and the edge defining the recesses of said retarding lever said lever being adapted to additionally impart rotating movement and accelerate the rotative movement thereof as said rotor stud engages the lever edge defining said remaining recess whereby said flashlight circuit is closed an interval before the operation of the camera shutter in order to effect shutter operation at time of maximum light attainment from said flashlight.

2. In combination with a camera including a shutter and mechanism for releasing said shutter; a battery and light socket container; a bracket for releasably mounting said battery and flashlight container to a portion of said camera; a plano-parabolic reflector mounted on the upper end of said battery and the socket container; a manually adjustable synchronizing device for adjusting the time of shutter operation to the time of maximum light produced by said flashlight and including a casing, a spring-impelled rotor journalled therein; flexible cable means between said rotor and the camera shutter; electrical conducting elements forming a part of the circuit from the battery to the flashlight bulb and extending into said casing; a metal contact member on said rotor adapted to close said battery and flashlight circuit through electrical connection of the casing contained portions of said electrically conducting elements; a manually movable lever pivoted in said casing for normally holding the rotor in cocked position; a retarding lever pivoted at one of its ends in said casing and having a pair of adjacent recesses in the normally lower edge thereof and forming a projection therebetween; a tension spring in said casing and connected to the free end of said retarding lever; and a transversely projecting stud on said rotor, said rotor stud being adapted to frictionally engage the retarding lever recess nearest the free end of said lever to thereby retard and delay the initial portion of the spring-impelled rotation of said rotor, said spring-imparted normally downward pull of said retarding lever being adapted to accelerate the rotation of said rotor when said rotor stud passes said tooth and slides along said second recess to thereby cause camera shutter operation at the time of maximum light attainment of said flashlight means.

3. In a device of the described class, a synchronizing device including an enclosing casing; a spring-impelled rotor journalled in said casing; flexible cable means operatively connecting an outer portion of said rotor and the camera shutter; electrical conducting elements forming a part of the circuit from the battery to the flashlight bulb and extending into said casing; a metal contact member on said rotor adapted to close said battery and flashlight circuit through electrical connection of the casing contained portions of said electrically conducting elements; a manually movable lever pivoting in said casing for normally holding the rotor in cocked position, a flexible cable release mounted at one of its ends in a wall of said casing and adapted to release said releasable lever; a perpendicularly extending projection on said rotor; a lever pivoted at one end in said casing and having a pair of substantially adjacent recesses therein, said rotor projection being adapted to engage said recesses during clockwise rotation; adjustable spring means for pulling said retarding lever in a normally downward direction to cause the lever edges defining said recesses to be frictionally engaged by said rotor projection, the said retarding lever being adapted to decrease the speed of the normal spring-impelled rotor movement while said rotor projection engages said first recess and being adapted to assist the spring-impelled rotor movement and to accelerate said rotor movement as the rotor projection slides along said second recess to thereby delay camera shutter operation at the time of maximum light attainment of said flashlight bulb.

4. In a device for selectively and simultaneously actuating a camera shutter and closing an electrical flashlight circuit; a metal casing; a removable cover plate for said casing; a rotor journalled for movement in said casing; said rotor having suitable radially projecting elements thereon; a stud on the side of said rotor; a substantially tubular member mounted on one wall of said casing and adapted to provide releasable mounting means for a flexible cable element; a flexible cable element having one end releasably mounted in said tubular connection member; a plunger slidably mounted in said tubular member; a coil spring connected at one end to said rotor and adapted to ride on a portion of the periphery thereof and having its other end connected to said plunger; a lever pivotally mounted in said casing and having a portion extending exteriorly thereof and adapted to engage one of said radially projecting elements of said rotor to normally hold said rotor in cocked position; a pair of electrical conductive elements mounted on and projecting inwardly and outwardly from one wall of said casing and adapted to form a part of the battery and flashlight circuit; a metal circuit closing element on said rotor adapted to conductively connect said electrical conductive elements; a spring in said casing for impelling said rotor in one direction, the release of said tripping lever being adapted to release said rotor for spring-impelled movement to move said plunger to in turn move said shutter actuating flexible cable and being adapted to simultaneously conductively connect said electrical conducting members in said casing, a retarding lever pivoted in said casing and having edge recesses adapted to be engaged by said rotor stud during clockwise movement of said rotor, the lever edge defining the first of said recesses being adapted to retard and slow the spring-impelled rotation of said rotor and the latter of said recesses permitting a quickened rotor rotation as said rotor stud enters said latter recess; and a spring in said casing for holding said recess lever edge against said rotor stud.

5. In a manually adjustable device for synchronizing the times of relative operation of a camera shutter and of flashlight means adapted to be connected to a camera which includes said shutter; a housing having openings therein; spring-impelled rotor journalled in said housing; integral radially projecting elements on said rotor; a stud on said rotor; flexible cable means connected at one end to said rotor and adapted to be moved by said rotor to release the camera shutter; electrical conductive elements including a pair of spaced contact posts electrically connecting the flashlight means and a battery, said contact posts being mounted in one wall of said housing; a metal contact element on said rotor adapted to conductively connect the inner portions of said contact posts to close the circuit of said flashlight means to the battery thereof; a lever fulcrumed in said housing and projecting through one of said housing openings, the inner end of said lever being adapted to releasably engage one of the radial projections of said rotor; a retarding lever in said housing and pivoted at one of its ends therein, said lever having a pair of curved adjacent recesses on its normally downward edge, said recesses forming a projecting tooth therebetween, said lever recess being located so that said rotor stud will slide from one recess and into the second recess; a tension spring within said housing connecting one end to the free end of said retarding lever; an adjustable anchoring member movably mounted in the lower wall of said housing, the other end of said tension spring being connected to said anchoring member; the adjustable tension of said tension spring being adapted to vary the degree of friction between said rotor stud and said recesses; the first lever recess being so curved as to slow the normal spring-impelled rotation of said rotor and the second of said lever recesses being adapted to aid and accelerate the normal spring-impelled rotation of said rotor to thereby delay camera shutter operation until maximum light attainment of said flashlight means.

6. In an adjustable device for synchronizing operation of a camera shutter in relation to associated flashlight means; a casing; a rotor element journalled in said casing; a flexible cable element connected at one end at the periphery of said rotor and the other end being operatively connected to release a camera shutter; a pair of plug-receiving contact posts mounted in and extending through the wall of said casing and insulated therefrom; said contact posts being adapted to receive the removable plug of electrical conducting wires which have the other ends connected to the flashlight means; a pair of spaced apart metal contact elements extending inwardly of said casing from said plug posts; a metal contact strip on said rotor and adapted to form a conductive connection between the said metal contact elements when said rotor is partially rotated; a spring mounted in said casing and connected to said rotor and adapted to normally move said rotor in clockwise direction; a stud element for limiting the clockwise movement of said rotor; a retarding friction lever pivotally mounted in said casing; a second projecting stud on said rotor; said retarding lever having a pair of adjacent downwardly facing edge recesses on an intermediate portion thereof, said edge recesses forming a normally downwardly projecting tooth therebetween, the recess nearest the pivoted end of said lever being relatively deeper; manually adjustable spring means connected to the pivoted end of said retarding lever to pull the same in a normally downward direction, the first contacted recess being adapted to slow the normal clockwise rotation of said rotor and to thereby delay the closing of the flashlight camera shutter operation, the spring-impelled movement of said retarding movement being adapted to accelerate the rotation of said rotor as said second rotor stud passes said tooth and engages said second recess to thereby effect camera shutter operation at the time of maximum light attainment of said flashlight means; and a manually actuable lever fulcrumed in said housing for normally holding said rotor in cocked position, said lever, when moved to releasing position, being adapted to release said rotor from cocked position.

7. In a manually adjustable device for synchronizing the time of relative operation of a camera shutter and of flashlight means adapted to be connected to a camera which includes said shutter; a housing; a spring-impelled rotor journalled in said housing, said rotor having a pair of diametrically opposite shoulders forming engageable projections; a sleeve-like shell mounted in the upper portion of said housing and projecting outwardly therefrom; a radially projecting element on said rotor; a stud on said rotor extending substantially perpendicularly therefrom; flexible cable means connected at one end to the radially projecting element of said rotor and having a portion thereof slidably mounted in said shell and adapted to be moved by the rotor to move a shutter-release cable; spaced apart electrical conductive elements conductively connecting the flashlight means and mounted in one wall of said housing and projecting thereinto; a metal contact element on one face of said rotor adapted to conductively connect said inwardly projecting portions of said electrical conductive elements, said metal contact element being adapted to close the circuit of said flashlight means to the batteries thereof; a manually operable lever means fulcrumed in said housing and extending exteriorly thereof, the inner end of said lever being adapted to releasably engage one of said projections of said rotor; a retarding lever pivotally mounted in said casing, said lever having a pair of substantially adjacent edge recesses forming a tooth-like projection therebetween and adapted to frictionally engage said rotor stud; an adjustable spring anchoring element in the lower wall of said housing; a tension spring mounted in said housing connecting one end of said retarding lever and said anchoring element, said adjustable anchoring element being adapted to adjust the tension of said spring and being adapted to regulate the degree of friction between said edge recess surfaces of said retarding lever and said rotor stud, the curvature defining the first contactable recess being such as to slow the initial rotative movement of the rotor and said other adjacent recess of said lever being relatively deeper and presenting a curved edge surface which, when engaged by said rotor stud, causes the spring-impelled tension of said retarding lever to push said rotor stud toward releasing position to thereby accelerate the latter portion of the rotor movement; whereby the camera shutter is operated simultaneously with the maximum light flash of said flashlight means; and a grippable handle element exteriorly of said housing and operatively connected to said rotor whereby said rotor may be moved to cocked position.

GEORGE ALBERT LEY.